United States Patent
Reich (10) Patent No.: US 11,600,813 B2
(45) Date of Patent: Mar. 7, 2023

(54) METHOD AND INSTALLATION FOR PRODUCING AN ELECTRODE PLATE, AN ELECTRODE PLATE AND A RECHARGEABLE ELECTROCHEMICAL BATTERY

(71) Applicant: Clarios Germany GmbH & Co. KG, Hannover (DE)

(72) Inventor: Tatjana Reich, Neustadt (DE)

(73) Assignee: Clarios Germany GmbH & Co. KG, Hannover (DE)

(*) Notice: Subject to any disclaimer, the term of this patent is extended or adjusted under 35 U.S.C. 154(b) by 0 days.

(21) Appl. No.: 16/773,742

(22) Filed: Jan. 27, 2020

(65) Prior Publication Data

US 2020/0161636 A1 May 21, 2020

Related U.S. Application Data

(63) Continuation of application No. 14/908,527, filed as application No. PCT/EP2014/066515 on Jul. 31, 2014, now Pat. No. 10,581,067.

(30) Foreign Application Priority Data

Aug. 1, 2013 (DE) .......................... 102013108266.1

(51) Int. Cl.
  *H01M 4/22* (2006.01)
  *H01M 4/04* (2006.01)
  (Continued)

(52) U.S. Cl.
  CPC ............. *H01M 4/22* (2013.01); *H01M 4/043* (2013.01); *H01M 4/0435* (2013.01); *H01M 4/20* (2013.01); *H01M 4/73* (2013.01); *H01M 10/06* (2013.01)

(58) Field of Classification Search
  None
  See application file for complete search history.

(56) References Cited

U.S. PATENT DOCUMENTS

| 3,853,626 A | 12/1974 | Daniels, Jr. et al. |
| 4,342,342 A | 8/1982 | Wheadon |

(Continued)

FOREIGN PATENT DOCUMENTS

| DE | 4300462 | 7/1994 |
| DE | 102007005816 A1 | 8/2008 |

(Continued)

OTHER PUBLICATIONS

PCT/EP2014/066515 International Search Report and Written Opinion dated Oct. 17, 2014, 14 pgs.

*Primary Examiner* — Haroon S. Sheikh
(74) *Attorney, Agent, or Firm* — Boardman & Clark LLP (57) ABSTRACT

An electrode plate of a rechargeable electrochemical battery. The electrode plate comprises a substantially flat lead grid having a plurality of grid bars and a plurality of window-like cutouts formed between the grid bars. The electrode plate further comprises an active material introduced into the cutouts and/or onto the grid bars of the lead grid. The active material has an artificially produced pattern of slot-shaped depressions on its surface. The depressions extend to a depth from the outer surface of the active material. Also disclosed is a rechargeable electrochemical battery comprising the at least one electrode.

15 Claims, 5 Drawing Sheets

(51) Int. Cl.
H01M 4/73 (2006.01)
H01M 4/20 (2006.01)
H01M 10/06 (2006.01)

(56) References Cited

U.S. PATENT DOCUMENTS

| | | |
|---|---|---|
| 4,417,608 A | 11/1983 | McCartney, Jr. et al. |
| 7,514,179 B2 | 4/2009 | Yoshimine et al. |
| 10,581,067 B2 | 3/2020 | Reich |
| 2009/0104524 A1 | 4/2009 | Catelli et al. |
| 2010/0216025 A1 | 8/2010 | Kelley et al. |

FOREIGN PATENT DOCUMENTS

| | | | |
|---|---|---|---|
| JP | 57009067 | 1/1982 | |
| JP | S5715361 A | 1/1982 | |
| JP | 58093161 | 6/1983 | |
| JP | 60216447 A | 10/1985 | |
| JP | 62051156 | 3/1987 | |
| JP | 07183028 | 7/1995 | |
| WO | WO-2011130514 A1 * | 10/2011 | ............ H01M 10/14 |

* cited by examiner

Fig. 1

METHOD AND INSTALLATION FOR PRODUCING AN ELECTRODE PLATE, AN ELECTRODE PLATE AND A RECHARGEABLE ELECTROCHEMICAL BATTERY

CROSS REFERENCE

This application claims priority to and is a continuation of U.S. Nonprovisional application Ser. No. 14/908,527 entitled "METHOD AND INSTALLATION FOR PRODUCING AN ELECTRODE PLATE, AND ELECTRODE PLATE AND A RECHARGEABLE ELECTROCHEMICAL BATTERY," filed Feb. 15, 2016, now U.S. Pat. No. 10,581,067, which claims priority to and is a National Stage filing of International Application No. PCT/EP2014/066515 entitled, "METHOD AND INSTALLATION FOR PRODUCING AN ELECTRODE PLATE, AND ELECTRODE PLATE AND A RECHARGEABLE ELECTROCHEMICAL BATTERY," filed Jul. 31, 2014, which claims priority to and the benefit of German Application No. 102013108266.1 filed Aug. 1, 2013, each of which is hereby incorporated by reference in its entirety for all purposes.

DESCRIPTION

The invention relates to a method for producing an electrode plate of a rechargeable electrochemical battery in accordance with the preamble of claim 1. The invention additionally relates to an installation for producing such an electrode plate in accordance with claim 9, an electrode plate in accordance with claim 10 as well as a rechargeable electrochemical battery in accordance with claim 11.

In general, the invention relates to the field of rechargeable electrochemical batteries having plate-shaped battery electrodes, also known as electrode plates. Such rechargeable electrochemical batteries are manufactured in particular as lead-acid batteries. The acid thereby forms a liquid electrolyte. Depending on the embodiment of the rechargeable battery, the liquid electrolyte can be unbounded or bound in a fiber-like material. In the latter case, such a rechargeable battery can be designed as an AGM battery, wherein AGM stands for Absorbent Glass Mat. In these types of rechargeable batteries, at least part of the electrode plates, usually the positive electrode plate, can be covered by a microglass mat separator, e.g. in the manner of the electrode plate being wrapped within the microglass mat separator during its manufacture, similar to gift-wrapping a present.

With these types of rechargeable batteries, it is desirable for the electrolyte to moisten the electrode plates as quickly and evenly as possible when the battery is filled with the liquid electrolyte for the first time. The capacity of the electrode plates to absorb electrolyte can vary significantly depending on their specific manufacturing technology.

The invention is thus based on the task of specifying a method for producing an electrode plate which exhibits improved electrolyte absorbency as independently as possible from the manufacturing technology used to produce said electrode plate. Further specified is an advantageous installation for producing an electrode plate as well as an electrode plate and a rechargeable electrochemical battery having such an electrode plate.

This task is solved in accordance with claim 1 by a method for producing an electrode plate of a rechargeable electrochemical battery having the following steps performed in the following order:

a) producing a substantially flat lead grid having a plurality of grid bars and a plurality of window-like cutouts formed between the grid bars,
b) introducing active material into the cutouts and/or onto the grid bars of the lead grid,
c) creating a pattern of slot-shaped depressions in the active material by mechanically impacting the lead grid provided with the active material, wherein the depressions extend to a depth from the outer surface of the active material. To be noted at this point is that the inventive solution comprises the creating of depressions in the active material, wherein these depressions extend to a depth from the outer surface of the active material. Such depressions are for example cracks, particularly pressure or stress cracks in the active material, or however also rift-shaped depressions created by mechanically impacting the lead grid provided with the active material. As will be described in greater detail below, the crack structure can be produced in particularly simple and easily realized manner when the active material has already at least slightly hardened. The "outer surface" of the active material, from which the depressions extend to a depth, thereby substantially corresponds to the outer surface of the active material after the active material has been introduced into the cutouts and/or onto the grid bars of the lead grid.

The pattern of slot-shaped depressions created by mechanical impact can significantly improve the capacity of the electrode plate to absorb electrolyte.

Positive electrode plates, in which the lead grid is produced in a stamping process, in particular show considerable improvements since they otherwise have an active material with relatively smooth surface. Generally speaking, however, the invention can achieve improved electrolyte absorbency for any type of electrode plate independent of manufacturing technology along with more uniform electrolyte wetting of the active material. The invention is therefore also advantageously applicable to electrode plates in which the lead grid is produced for example by casting. The invention is suited to both positive as well as negative electrode plates. The invention thus in particular enables better production of rechargeable batteries in which the electrode plates are pressed together closely within the battery case.

The depressions created by mechanical impact extend to a depth within the active material from the outer surface of said active material. The depressions thereby form fine cracks as it were in the otherwise rather uniform surface of the active material. It is advantageous for the depressions to be at least 0.5 to 1 mm in depth. The depressions can also completely penetrate the active material; i.e. extend all the way through to the lead material of the lead grid, although doing so is not mandatory. The depth of the depressions do not have to be the same across the length of the depressions and can also vary among different depressions.

The pattern of slot-shaped depressions can be produced in various ways. For instance, a type of press can be used to mechanically impact the active material. The press can already exhibit the respective raised structures which correspond to the depressions to be produced. When creating the pattern of slot-shaped depressions on opposite sides of the electrode plate provided with active material, two presses can also be employed, between which the electrode plate is arranged. The presses are then moved toward each other relatively, pressing the electrode plate between them, whereby a pattern of slot-shaped depressions is produced on both sides of the electrode plate.

The pattern of slot-shaped depressions can also be produced by deforming the lead grid provided with the active material. This can thereby capitalize on the varying degrees of elasticity to the materials used, namely the lead material and the material of the active material. In particular, the pasty active material dries/hardens first such that it becomes relatively brittle, at least compared to the softer lead material. The lead material can readily follow the deformation movements during deformation of the lead grid provided with the active material without being damaged. However, a type of fracturing in the surface structure of the active material thereby ensues so that the desired crack structure will be formed; i.e. a pattern of slot-shaped depressions in the active material. Tests have shown that bending the lead grid provided with the active material back and forth once or twice suffices for the purpose of producing the desired crack structure.

Also, a combination of the cited method steps for creating the pattern of slot-shaped depressions is advantageous. The mechanical impact can be applied for example by an impacting tool or manually. The pressure exerted in the mechanically impacting of the lead grid provided with the active material is to be regulated so as to produce just the desired depressions but not loosen the active material from the lead grid or damage the lead grid. Since the lead grid itself is relatively soft and deformable but the active material comparatively brittle, the lead grid will not suffer damage when the pressure force is correctly set whereas cracks will form in the harder active material.

One advantageous further development of the invention provides for the pattern of slot-shaped depressions to only be realized by deformation of the lead grid provided with the active material, only by mechanically impacting the active material, or only by a combination of these alternatives. This enables the pattern of slot-shaped depressions to be created quickly and efficiently and also keeps the equipment costs in check. An installation for producing an electrode plate thereby only needs fewer, more economical modifications.

According to one advantageous further development of the invention, the pattern of slot-shaped depressions is produced during or following the pre-drying or during or following the curing of the active material. This has the advantage of the active material already being somewhat harder and more brittle, and thus allowing the desired cracked structure to be produced more easily and faster. Curing as relates to the manufacturing of rechargeable batteries refers to the final hardening of the active material as is then found on the finished electrode plate.

According to one advantageous further development of the invention, the mechanical impacting is effected with rounded profile contours and/or sharp-edged profiles. Particularly when the above-cited press is used, the surface of same can have sharp-edged profiles. Using rounded profile contours has the advantage of producing the pattern of slot-shaped depressions in a relatively gentle manner and being better able to prevent unwanted damaging of the electrode plate. Wasting of active material from the electrode plate in response to the mechanical impact is in particular prevented, e.g. due to falling or being forced out of individual window-like cutouts. A wave profile in particular can be used for the rounded profile contour, e.g. in the form of staggered roller belts, individual cylindrical rollers or spheres or semi-spheres.

With respect to sharp-edged profiles, these can be e.g. blade or needle-shaped, for example in the form of a piercing unit or a network of blades.

In accordance with one advantageous further development of the invention, the impacting tool for mechanically impacting the lead grid provided with the active material thus comprises rollers, cylinders and/or spheres and/or semi-spheres, or an upper and lower press between which the lead grid provided with the active material is pressed.

According to one advantageous further development of the invention, the lead grid provided with the active material is moved in a continuous motion relative to an impacting tool during the mechanical impacting. The impacting tool thereby performs the mechanical impacting of the lead grid provided with the active material. The lead grid can thus be continuously pulled or pushed through, e.g. by an impacting tool configured in the form of staggered roller belts. Said movement can also be discontinuous such that the lead grid provided with the active material is stationary during the mechanical impact and moved relative to the impacting tool prior to and subsequent the mechanical impact. This is particularly advantageous when the above-cited press is used to introduce the pattern of slot-shaped depressions. In this case, the lead grid to be processed can be automatically driven into a machining station in which the presses are arranged, the presses then operated, and thereafter, after the presses retreat again, the lead grid provided with the pattern of slot-shaped depressions removed from the machining station.

According to one advantageous further development of the invention, the depressions are produced in the electrode plate's horizontal direction of extension and/or vertical direction of extension; in each case relative to the electrode plate's mounting orientation in a rechargeable electrochemical battery in the battery's normal position according to specifications. As a general rule, a horizontal alignment to the bottom of the battery is the battery's normal position according to specifications. The depressions can also run in a combined horizontal and vertical direction of extension; i.e. diagonally at different angles.

The pattern of slot-shaped depressions can thereby form an irregular, network-like structure or a regular structure. The individual depressions can merge into one another, intersect or run separately from other depressions.

The task as initially specified is further solved in accordance with claim 9 by an installation for producing an electrode plate of a rechargeable electrochemical battery, whereby the electrode plate comprises a substantially flat lead grid having a plurality of grid bars and a plurality of window-like cutouts formed between the grid bars and active material introduced into the cutouts and/or on the grid bars of the lead grid, wherein the installation comprises at least one lead grid-producing station for producing the lead grid, one pasting station for introducing the active material, and one depression-forming station in which the pattern of slot-shaped depressions is produced in the active material by mechanically impacting the lead grid provided with the active material, wherein the depressions extend to a depth from the outer surface of the active material.

Advantageously, the lead grid-producing station and pasting station system components can be further used in installations already being used by manufacturers of such electrode plates. Only the depression-forming station needs to be supplemented. Same comprises inter alia an impacting tool for mechanically impacting the lead grid provided with the active material. The impacting tool can in particular be designed pursuant to the above-described embodiments. The cited installation can advantageously realize one or more of the above-cited methods for producing an electrode plate. Accordingly, the installation can produce an electrode plate having the advantages as specified at the outset, particularly improved electrolyte absorbency.

According to one advantageous further development of the invention, at least the depression-forming station has a housing to shield the electrode plate from the surroundings at least during mechanical impacting. This has the advantage of shielding the surroundings from any possible contaminants which may be discharged during production of the slot-shaped depressions such as e.g. lead dust.

According to one advantageous further development of the invention, the installation comprises a plate-smoothing station which is arranged downstream of the depression-forming station with respect to the processing sequence. The electrode plates being processed in the installation thus arrive at the plate-smoothing station after being machined in the depression-forming station. The electrode plates are externally smoothed again in the plate-smoothing station prior to further processing. This has the advantage of the electrode plates thus again being compatible with further manufacturing process steps and these being able to be performed without any change to the manufacturing process. The pattern of the slot-shaped depressions in the active material is however thereby retained.

The plate-smoothing station can be arranged together with the depression-forming station in the above-described housing.

The depression-forming station can be arranged in the installation at the point where the electrode plates are separated for the first time after curing, e.g. directly before the wrapping machine in which the electrode plates are wrapped in the separator material. The plate separation there can for example proceed to the depression-forming station and from there into the wrapping machine feed. Since these types of installations already protect personnel from lead dust at this point, no additional lead dust extraction measures are required. The depression-forming station can be introduced into the manufacturing process virtually anywhere subsequent pasting; i.e. subsequent the introducing of the active material, up until the point the plate set is inserted into the battery case. In particular, mechanical impacting to produce the pattern of slot-shaped depressions can also not occur until the electrode plate is already wrapped in the separator material.

The task as initially specified is further solved in accordance with claim 10 by an electrode plate of a rechargeable electrochemical battery, whereby the electrode plate comprises a substantially flat lead grid having a plurality of grid bars and a plurality of window-like cutouts formed between the grid bars and active material introduced into the cutouts and/or on the grid bars of the lead grid, whereby the active material has an artificially produced pattern of slot-shaped depressions on its surface, wherein the depressions extend to a depth from the outer surface of the active material.

The task as initially specified is further solved in accordance with claim 11 by a rechargeable electrochemical battery having at least one electrode plate of the above-cited type.

The following will reference the drawings in describing the invention in greater detail based on example embodiments.

Shown are.

The figures provide like elements with like reference numerals.

An example of the fundamental structure of a rechargeable battery 100 according to the invention will first be described with reference to FIG. 1. The rechargeable battery 100 can in particular be implemented as a lead-acid battery having liquid electrolyte, e.g. in the form of sulfuric acid. The rechargeable battery 100 comprises a case 110 in which one or more plate packs 107 are arranged. The rechargeable battery 100 has a specified number of plate packs 107 corresponding to its number of cells. The plate packs 107 are each arranged in individual holding chambers of case 110 separated from each other by partition walls. The plate packs 107 are connected together into a series connection within the case 110 by internal connecting elements (not depicted in FIG. 1). The positive plates of a plate pack on one end and the negative plates of the other plate pack on the other end are in each case electrically connected to respective external terminals 108, 109 provided in a cover piece 111 of the rechargeable battery case 110. The electrical energy of the battery 100 for electrical loads is supplied through terminals 108, 109.

The plate packs 107 exhibit respectively alternating positive and negative electrode plates. The negative electrode plates are shown as negative plate set 115, the positive electrode plates as positive plate set 114. FIG. 1 still depicts some individual electrode plates in exemplification; i.e. negative electrode plate 105 having a negative flat lead grid 102 and positive electrode plate 104 having a positive flat lead grid 101. The positive electrode plate 104 and the negative electrode plate 105 depicted in FIG. 1 have already been provided with a pasting of active material, covering the individual grid bars and cutouts. The positive and/or negative lead grid comprise(s) a plurality of grid bars and a plurality of window-like cutouts formed between the grid bars. The positive and/or negative lead grid 101, 102 can be produced for example by a stamping process or by another method such as casting and/or rolling.

The positive electrode plate 104 is additionally separated from the negative electrode plate 105 by a separator material 106. The separator material 106 can in particular be designed in the form of a wrapping which holds the positive electrode plate 104 and separates it from adjacent electrode plates.

The positive electrode plates 104 comprise respective connection tabs 103, by means of which the electrode plates in the positive plate set 114 are connected together in a parallel connection. The negative electrode plates 105 comprise respective connection tabs 103, by means of which the electrode plates in the negative plate set 115 are connected together in a parallel connection. The connection can be made by a connector 112 which is soldered or welded onto the connection tabs 103 as is visible in FIG. 1.

Figure 1:
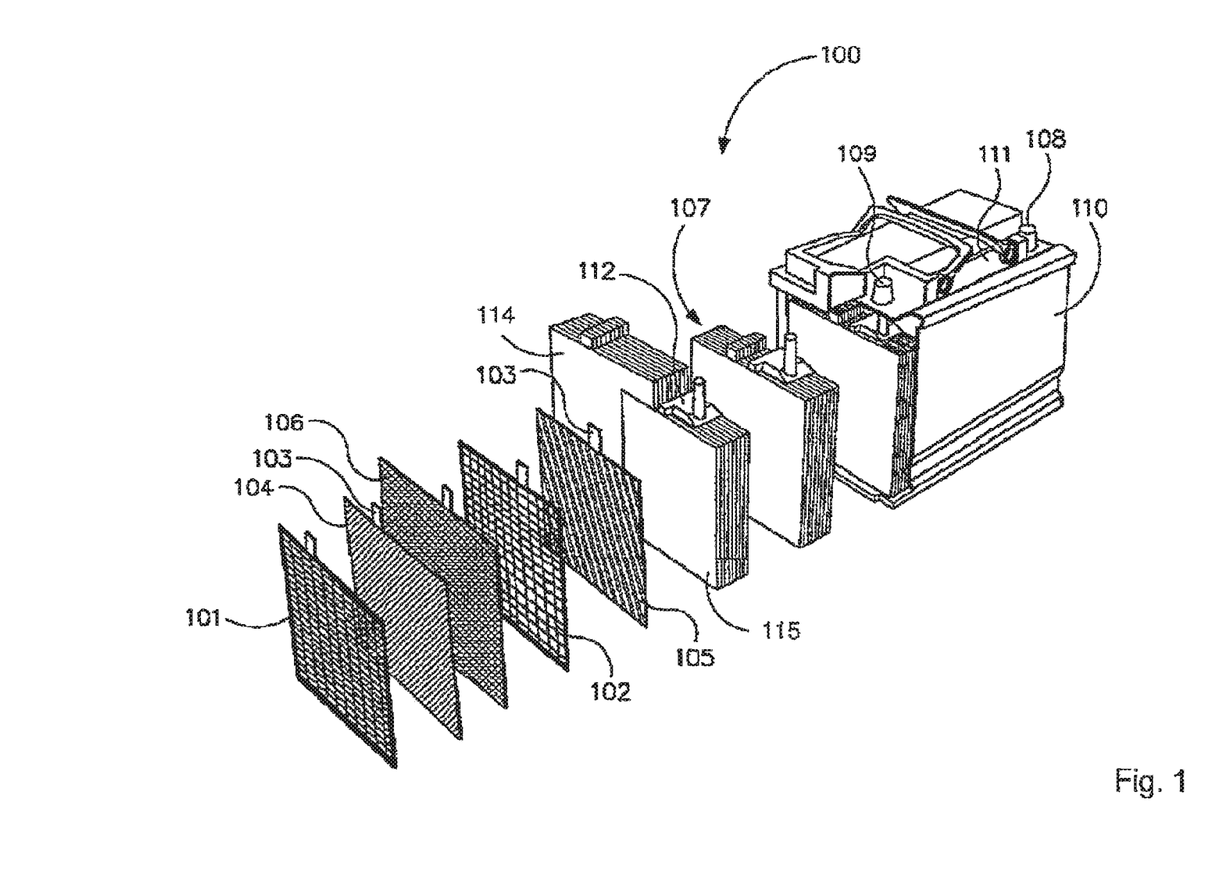
FIG. 1: a semi-exploded view of a rechargeable electrochemical battery as well as its components.

The rechargeable battery 100 according to FIG. 1 can in particular comprise one or more inventive electrode plates, e.g. in the form of positive electrode plates 104.

Figure 2:
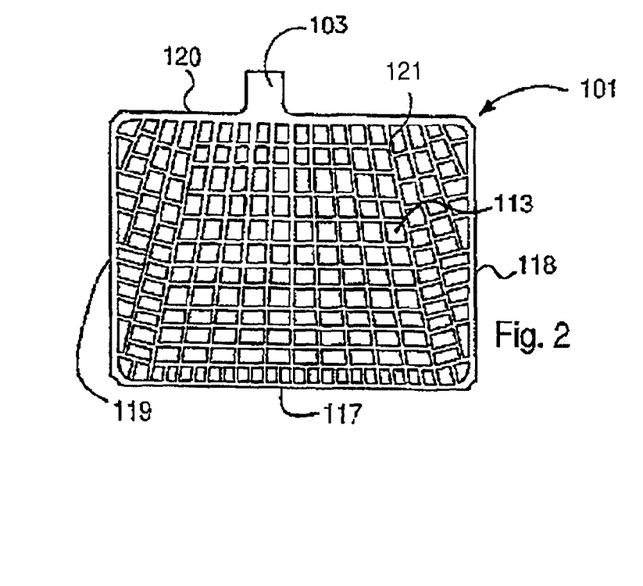
FIG. 2: a lead grid.

FIG. 2 shows an example of a positive lead grid 101 in plan view. It can be seen that the lead grid 101 comprises a plurality of grid bars 121, between which are found a plurality of window-like cutouts 113. To make it easier to handle and to provide mechanical stabilization as well as improve its electrical properties 1 the outer edge of the lead grid 101 can exhibit one, multiple or all of the following cited frame sections: upper frame section 120, left side frame section 119, lower frame section 117, right side frame section 118.

Figure 3:
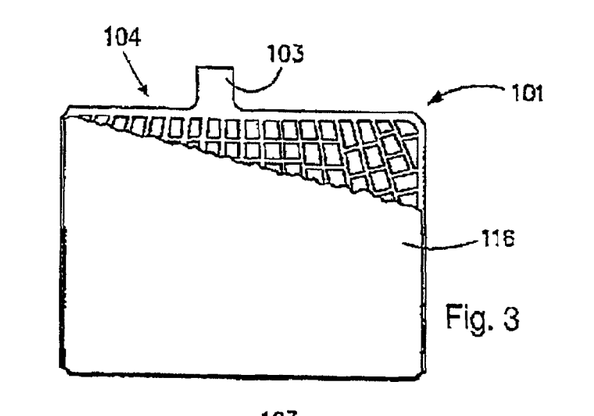
FIG. 3: a lead grid provided with an active material.
Figure 4:
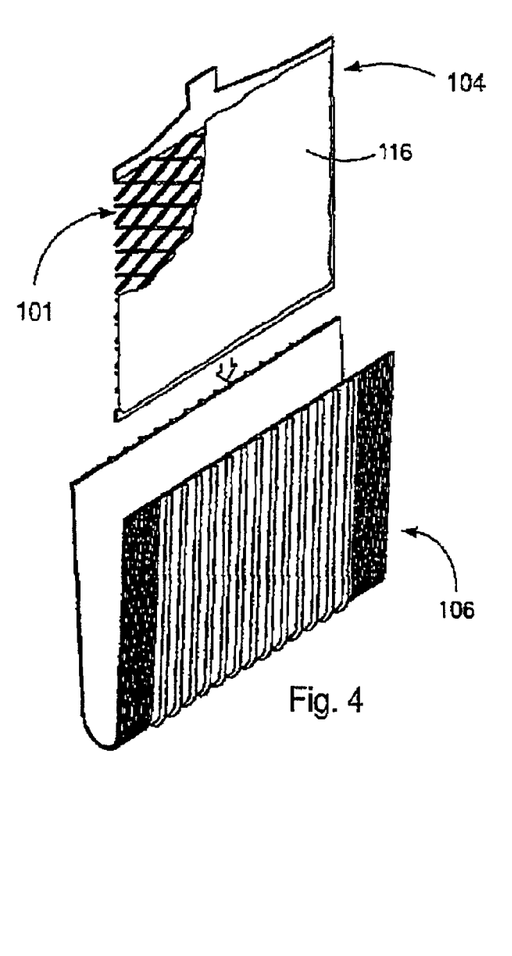
FIG. 4: the wrapping of a lead grid provided with an active material within a separator.

FIG. 3 shows the lead grid 101 from FIG. 2 after having been at least partly covered with active material, usually applied in paste form. This process is also known as pasting. FIG. 4 shows the lead grid 103 of FIG. 3 provided with the active material being inserted into a wrapper-shaped separator 106.

Figure 5:
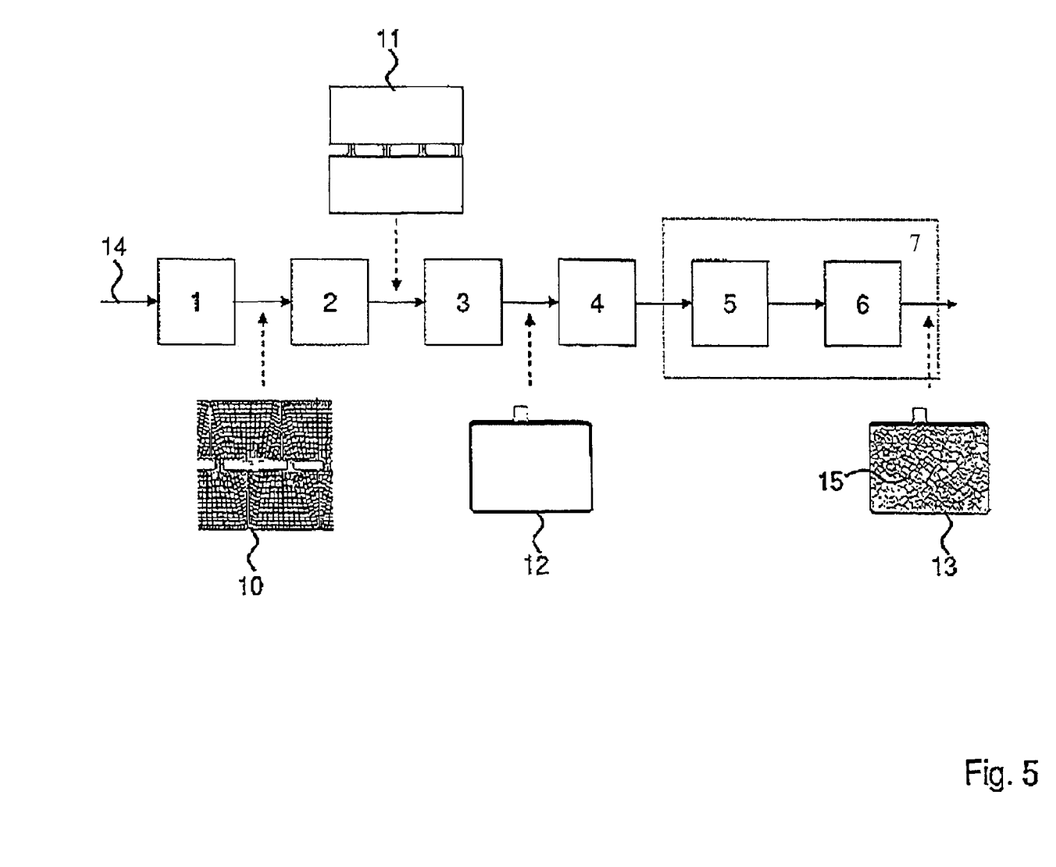
FIG. 5: an installation for producing an electrode plate.

FIG. 5 depicts an installation for producing an electrode plate, particularly a positive electrode plate 104 as described above, in schematic representation. The installation comprises various stations 1, 2, 3, 4, 5, 6, specifically a lead grid-producing station 1, a pasting station 2, a separating station 3, a storage station 4, a depression-forming station 5 and a smoothing station 6. The individual stations 1, 2, 3, 4, 5, 6 are, as FIG. 5 shows, successively arranged such that the raw material 14 fed into lead grid-producing station 1 will be processed step by step into the resulting electrode plate.

The lead grid-producing station 1 processes the pig lead supplied to it into a double-strand grid strip 10. This can be realized in lead grid-producing station 1 by means of a casting process, a rolling process and/or a stamping process. The double-strand grid strip 10 has an upper and a lower strand of lead grid 101 which are still contiguous. The upper and lower strand are additionally connected together by the connection tabs 103 of the lead grid 101. The double-strand grid strip 10 is still to be separated into the individual lead grids 101 later on.

First, however, the active material can be introduced in pasting station 2, producing the double-stranded pasted grid strip 11 as depicted in FIG. 5.

According to FIG. 5, the separating station 3 follows the pasting station 2. However, this is just one possible embodiment of the depicted installation. The separating station can for example also be alternatively arranged after smoothing station 6. For now, however, the embodiment as depicted in FIG. 5 is assumed.

Individual lead grids 104 provided with active material are separated from the double-strand pasted grid strip in separating station 3, and are also identified in FIG. 5 by reference numeral 12.

The electrode plate 12, or respectively its active material in particular, can be pre-dried, as well as cured as applicable, before said electrode plate 12 is fed to depression-forming station 5. To this end, the electrode plate 12 can be stored temporarily, e.g. in storage station 4. Alternatively, further processing in depression-forming station 5 can also follow immediately.

The slot-shaped depressions are produced in the active material in depression-forming station 5 by the electrode plate 12 being subjected to mechanical impact.

The electrode plate 12 is then subsequently machined in the smoothing station 6 so as to again effect an external smoothing of the active material, e.g. by passing the electrode plate 12 through a pair of rollers. Ultimately exiting the smoothing station 6 is an electrode plate 13 having the pattern 15 of slot-shaped depressions as seen in FIG. 5.

The electrode plate can alternatively be wrapped in the separator 106 either before or after the processing occurring in depression-forming station 5. To this end, the installation additionally comprises an appropriately situated wrapping station (not shown in FIG. 5), e.g. in the form of the above-cited wrapping machine.

If the separating station 3 is not arranged until after the smoothing station 6, the grid strip 11 is guided past the impacting tool of the depression-forming station 5, for example in a continuous motion. The impacting tool can then be designed as will be clarified below with reference to FIGS. 6 to 9.

The depression-forming station 5 can be enclosed in a housing 7 in order to trap emissions, e.g. lead dust, from the surroundings. The smoothing station 6 can also be arranged inside the housing 7.

FIGS. 6 to 9 show embodiments of the impacting tool of depression-forming station 5 with which the lead grid provided with the active material is mechanically impacted in order to produce the pattern of slot-shaped depressions in the active material.

Figure 6:
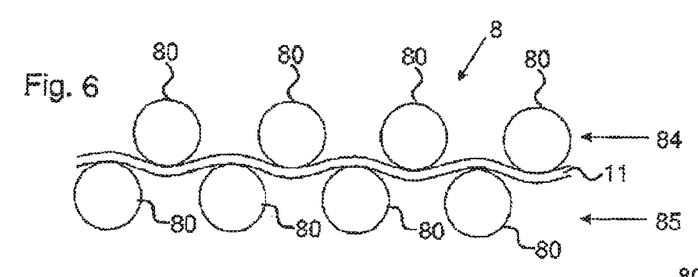
FIGS. 6-9: embodiments of an impacting tool having a rounded profile.

FIG. 6 shows an embodiment of the impacting tool 8 in a side view. The impacting tool 8 comprises an upper set 84 of rollers 80 as well as a lower set 85 of rollers 80.

The rollers 80 of the upper and lower set 84, 85 are arranged close together vertically or even overlap. The rollers 80 of a respective set 84, 85 have a greater distance from one another horizontally than they do vertically. The upper set 84 of rollers 80 is disposed opposite from the lower set 85 of rollers 80 at an offset. A grid strip 11, likewise depicted in side view in FIG. 6, led through the rollers 80 will thereby be curved into the wave-shaped form seen in FIG. 6. The rollers which are present after the grid strip 11 exits out of the impacting tool 8 can smooth the wave form out again into a substantially flat grid strip from which flat electrode plates can be produced. The impacting tool according to FIG. 6 is particularly well suited to a continuous feed of the lead grid or grid strip 11 respectively.

Figure 7:
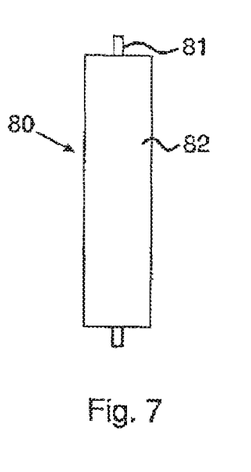
Figure 8:
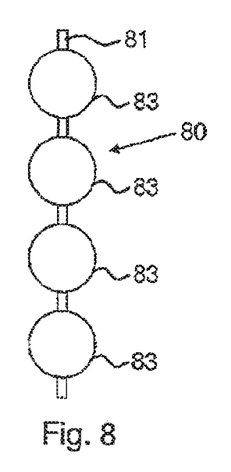
Figure 9:
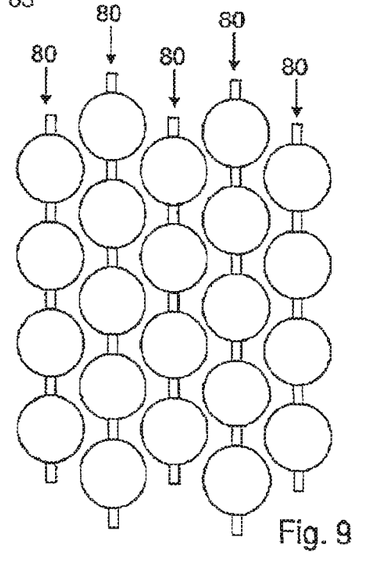

FIGS. 7 to 9 depict embodiments of sections of the impacting tool 8 as viewed from above; i.e. onto the upper set 84 of rollers. According to FIG. 7, each roller 80 has a cylindrical impacting body 82 mounted on a rotational axis 81. In one embodiment according to FIG. 8, the rollers 80 have spherical impacting bodies 83 arranged on a rotatable spindle 81. Instead of having a spherical form, the impacting bodies 83 can also have a different form such as an elliptical or angular form.

According to FIG. 9, a plurality of the spherical impacting bodies depicted in FIG. 8 are arranged adjacently, whereby the individual adjacent rows of the spherical impacting bodies are disposed at an offset from one another. FIG. 9 for example shows the upper section 84 of the impacting tool of FIG. 6. The lower section 85 can be of comparable design.

Figure 10:
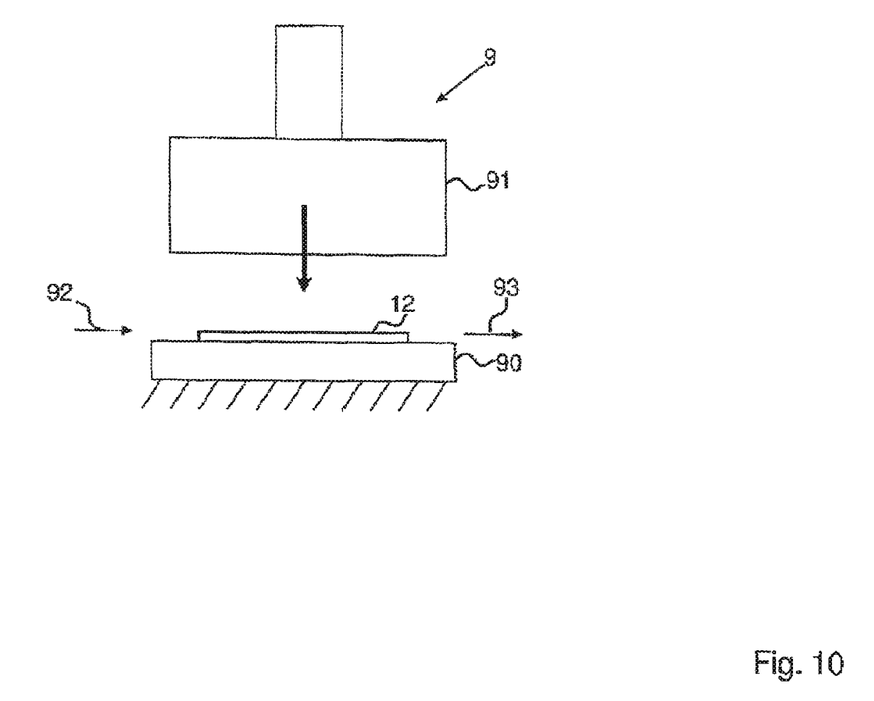
FIG. 10: a stamping press.

FIG. 10 shows one embodiment of an impacting tool as a stamping press 9. This embodiment is particularly suited to discontinuous electrode plate 12 movement, e.g. for already separated electrode plates 12. The electrode plate 12 to be processed is fed in as per arrow 92 and deposited on a lower die 90 of the stamping press 9. Although the lower die 90 can be stationary, as shown in FIG. 10, it can also be configured as a movable lower die. An upper press 91 is moved downward onto the electrode plate 12 as per the depicted arrow. The electrode plate 12 is then pressed between the upper press 91 and the lower die 90. The surface area provided on the upper press 91 and the lower die 90 for pressing the electrode plate thereby exhibits a structure which results in the pattern of slot-shaped depressions being produced in the active material of the electrode plate 12. The upper press 91 thereafter raises again and the electrode plate 12 is advanced in the direction of arrow 93.

The invention claimed is:

1. An electrode plate of a rechargeable electrochemical battery, the electrode plate comprising:
 a substantially flat lead grid having a plurality of grid bars and a plurality of window-like cutouts formed between the plurality of grid bars; and
 an active material introduced into the plurality of window-like cutouts, or onto the plurality of grid bars of the substantially flat lead grid, or both, to form an external surface of the electrode plate, the active material having an only artificially produced pattern of slot-shaped depressions on its external surface, the slot-shaped depressions extending to a depth from the external surface of the electrode plate in a direction toward the plurality of grid bars, the pattern of the slot-shaped depressions forming an irregular, network-like structure on the external surface, wherein at least a first slot-shaped depression of the slot-shaped depressions extends at least 0.5 mm to 1.0 mm in depth and at least a second slot-shaped depression of the slot-shaped depressions extends to a depth all the way through the active material to the substantially flat lead grid and wherein the pattern of the slot-shaped depressions forming the irregular, network-like structure is visible on the external surface of the electrode plate.

2. The electrode plate of claim 1, wherein the plurality of grid bars and the plurality of window-like cutouts form a pattern.

3. The electrode plate of claim 1, wherein the slot-shaped depressions are configured to overlap with a grid bar of the plurality of grid bars with respect to the direction.

4. The electrode plate of claim 1, wherein the irregular, network like structure on a portion of the external surface is different from an impacting surface of a mechanical impactor having contacted the portion of the external surface.

5. The electrode plate of claim 1, wherein the slot-shaped depressions were performed by mechanically impinging the substantially flat lead grid provided with the active material to cause the slot-shaped depressions to extend to the depth from the external surface of the electrode plate in the direction toward the plurality of grid bars.

6. The electrode plate of claim 1, wherein the first slot-shaped depression comprises a plurality of first slot-shaped depressions and the second slot-shaped depression comprises a plurality of second slot-shaped depression.

7. A rechargeable electrochemical battery comprising at least one electrode plate in accordance with claim 1.

8. A rechargeable electrochemical battery comprising:
a case;
a first terminal coupled to the case;
a second terminal coupled to the case; and
a battery cell enclosed by the case, the battery cell including a plate pack comprising
a first electrode plate with a first polarity, the first electrode plate coupled to the first terminal;
a second electrode plate with a second polarity different from the first polarity, the second electrode plate coupled to the second terminal;
a separator material separating the first electrode plate from the second electrode plate; and
wherein the first electrode plate comprises:
a substantially flat lead grid having a plurality of grid bars and a plurality of window-like cutouts formed between the plurality of grid bars; and
an active material introduced into the plurality of window-like cutouts, or onto the plurality of grid bars of the substantially flat lead grid, or both, to form an external surface of the first electrode plate, the active material having an only artificially produced pattern of slot-shaped depressions on its external surface, the slot-shaped depressions extending to a depth from the external surface of the electrode plate in a direction toward the plurality of grid bars, the pattern of the slot-shaped depressions forming an irregular, network-like structure on the external surface, wherein at least a first slot-shaped depression of the slot-shaped depressions extends at least 0.5 mm to 1.0 mm in depth and at least a second slot-shaped depression of the slot-shaped depressions extends to a depth all the way through the active material to the substantially flat lead grid and wherein the pattern of the slot-shaped depressions forming the irregular, network-like structure is visible on the external surface of the electrode plate.

9. The rechargeable electrochemical battery of claim 8, wherein the first polarity of the first electrode plate is a positive polarity, the first electrode plate is a positive electrode plate, and the first terminal is a positive terminal.

10. The rechargeable electrochemical battery of claim 8, wherein the separator material comprises a wrapping that at least partially wraps the first electrode plate and separates the first electrode plate from adjacent electrode plates including the second electrode plate.

11. The rechargeable electrochemical battery of claim 10, wherein the separator material includes a fiber-like material.

12. The rechargeable electrochemical battery of claim 10, wherein the separator material includes absorbent glass mat (AGM) material.

13. The rechargeable electrochemical battery of claim 8, wherein the irregular, network-like structure on a portion of the external surface is different from an impacting surface of a mechanical impactor having contacted the portion of the external surface.

14. The rechargeable electrochemical battery of claim 8, wherein the slot-shaped depressions were performed by mechanically impinging the substantially flat lead grid provided with the active material to cause the slot-shaped depressions to extend to the depth from the external surface of the first electrode plate in the direction toward the plurality of grid bars.

15. The rechargeable electrochemical battery of claim 8, wherein the first slot-shaped depression comprises a plurality of first slot-shaped depressions and the second slot-shaped depression comprises a plurality of second slot-shaped depression.

* * * * *